United States Patent
Ganzer et al.

(10) Patent No.: US 8,939,318 B2
(45) Date of Patent: Jan. 27, 2015

(54) ADHESIVE TANK MELTER HAVING SLIDING LID ASSEMBLY

(71) Applicant: Nordson Corporation, Westlake, OH (US)

(72) Inventors: Charles P. Ganzer, Cumming, GA (US); Scott D. Walker, Roswell, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 13/688,939

(22) Filed: Nov. 29, 2012

(65) Prior Publication Data

US 2014/0144523 A1    May 29, 2014

(51) Int. Cl.
| | |
|---|---|
| B65D 43/20 | (2006.01) |
| F17D 1/08 | (2006.01) |
| B05C 11/10 | (2006.01) |
| B65D 51/18 | (2006.01) |

(52) U.S. Cl.
CPC ................ *F17D 1/084* (2013.01); *B05C 11/10* (2013.01); *B05C 11/1042* (2013.01)
USPC ..................... 220/812; 220/254.9; 220/345.1; 220/345.6

(58) Field of Classification Search
USPC ............... 220/812, 254.9, 345.1, 45.6, 813
See application file for complete search history.

(56) References Cited

U.S. PATENT DOCUMENTS

| | | | |
|---|---|---|---|
| 3,339,785 A | * | 9/1967 | Nugent .......................... 220/232 |
| 4,456,151 A | * | 6/1984 | Lewellen .................... 222/146.5 |
| 4,821,922 A | * | 4/1989 | Miller et al. ...................... 222/77 |
| 4,878,596 A | * | 11/1989 | Cawley et al. ................. 220/812 |
| 4,934,562 A | * | 6/1990 | Early et al. ....................... 220/1.5 |
| 5,755,351 A | * | 5/1998 | Kruzick ........................ 220/812 |
| 2003/0192900 A1 | * | 10/2003 | Petzitillo et al. .............. 220/812 |
| 2009/0095730 A1 | * | 4/2009 | Ganzer et al. ................. 219/421 |
| 2013/0112709 A1 | * | 5/2013 | Ross et al. ................. 222/146.5 |

FOREIGN PATENT DOCUMENTS

| | | |
|---|---|---|
| FR | 2972720 A1 | 9/2012 |
| WO | 2012/120451 A1 | 9/2012 |

OTHER PUBLICATIONS

European Patent Office, European Search Report in EP Application No. 13187379, Mar. 21, 2014.

* cited by examiner

*Primary Examiner* — Mickey Yu
*Assistant Examiner* — Niki Eloshway
(74) *Attorney, Agent, or Firm* — Wood, Herron & Evans, L.L.P.

(57) ABSTRACT

An adhesive melter includes a melter tank with an interior communicating with a top opening, a sealing flange surrounding the top opening, and a lid assembly. The lid assembly includes guide rails and a lid for sliding on the guide rails between an open position exposing the top opening a closed position over the top opening. The lid includes a closure surface that slides generally along a plane of the sealing flange when the lid slides on the guide rails, and the closure surface also moves in a direction transverse to the plane defined by the sealing flange simultaneous to this sliding movement. The sliding movement of the lid enables an operator to grasp the handle and control the lid movement over the full range of lid movement, while the transverse movement of the closure surface avoids stiction forces from preventing sliding movement.

14 Claims, 8 Drawing Sheets

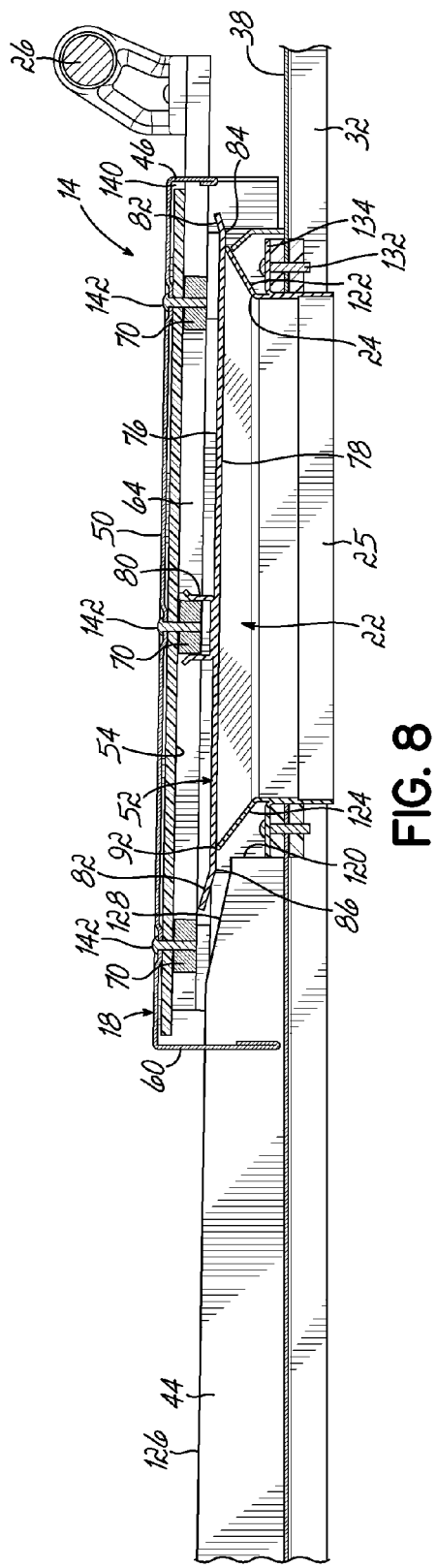

ADHESIVE TANK MELTER HAVING SLIDING LID ASSEMBLY

FIELD OF THE INVENTION

The present invention generally relates to an adhesive tank melter used with an adhesive dispensing system and, more particularly, to a lid assembly used with the tank melter.

BACKGROUND

A conventional dispensing system for supplying heated adhesive (i.e., a hot-melt adhesive dispensing system) generally includes a melter configured to receive adhesive in solid or semi-solid form and then heat and/or melt the adhesive, a pump in communication with the melter for driving and controlling the dispensation of the heated adhesive out of the melter, and one or more adhesive dispensing devices (e.g., guns or modules) receiving the heated adhesive from the pump. One or more hoses or manifolds may also be included in the dispensing system to direct the heated adhesive between the melter, pump, and dispensing devices. One particular type of melter used with conventional dispensing systems is a tank melter which includes a relatively large tank for storing molten adhesive that is to be delivered as needed by the dispensing devices. The tank is generally enclosed during normal operation to avoid releasing adhesive vapors formed during the melting of the adhesive into the surrounding environment. To this end, several types of adhesives used in dispensing operations require a positive seal on the tank during operation because the associated vapors can be hazardous.

However, the tank must also provide easy access for refilling or cleaning operations as well. As a result, an opening is provided on the top of the tank with a lid that can move between open and closed positions relative to the opening. The conventional lid is connected to the tank by a hinge adjacent to the opening. The lid rotates at the hinge between a generally horizontal orientation in which the lid covers the opening and a generally vertical orientation in which the opening provides access into the tank. In the closed position, the lid is held in position to seal closed the opening of the tank by the weight of the lid. Thus, the conventional hinged lid provides rapid and easy access into the tank when necessary while also enclosing the tank during normal operation.

Although the conventional hinged lid works well for its intended purpose of opening and closing the tank, this lid is subject to several drawbacks. For example, the tank in larger melters may have an opening that is located 48 inches or more from a ground surface. As a result, a handle on the lid may not be able to be held by all operators throughout the full range of the pivoting movement of the lid. In such circumstances, the operator may be forced to throw open the lid or tip the lid closed with a tool, and these actions often lead to uncontrolled movements of the lid between the open and closed positions. These uncontrolled movements cause the lid to stress the hinge, especially upon impact at the limiting open and closed positions. The stressing of the hinge may lead to damage of the hinge that renders the lid unsafe or inoperable. Moreover, the uncontrolled falling of the lid can pinch the hands or fingers of an operator at the opening. When the lid is opened, any adhesive droplets that condense on the lid from the vapors within the tank may fall down the generally vertical lid into the hinge. These droplets can solidify and adversely affect the operation of the hinge and the lid over time.

For reasons such as these, an improved lid assembly for use with a tank melter of an adhesive dispensing system would be desirable.

SUMMARY OF THE INVENTION

According to one embodiment of the invention, an adhesive melter includes a melter tank having a top opening and an interior communicating with the top opening. The melter also includes a sealing flange surrounding the top opening. The melter also includes a lid assembly configured to selectively open and close the melter tank at the top opening. The lid assembly includes guide rails positioned on the melter tank on opposite sides of the top opening. A lid of the lid assembly includes a closure surface adapted to selectively engage the sealing flange. The lid is coupled to the guide rails for movement of the lid between an open position for filling the interior with adhesive through the top opening and a closed position engaging the sealing flange. The movement between the open and closed positions includes movement of the closure surface in a direction transverse to a plane defined by the sealing flange simultaneous to sliding movement of the closure surface generally along the plane. To this end, the closure surface is not dragged along the sealing flange during movement of the lid between open and closed positions.

In one aspect, the lid includes a first portion coupled to the guide rails for the sliding movement and a second portion having the closure surface. The second portion is moveable relative to the first portion so that the closure surface can move in the direction transverse to the plane simultaneous to the sliding movement. In one particular example, the first portion includes an outer cover configured to partially surround the second portion. The second portion may include a floating plate defining the closure surface. The floating plate is operatively coupled to the outer cover such that sliding movement of the outer cover causes sliding movement of the floating plate along the plane, but the floating plate is free to move relative to the outer cover in the direction transverse to the plane. In this regard, the floating plate may include an elongate receptacle configured to receive a crossbar coupled to the outer cover.

In another aspect, the lid assembly further includes a support rail that is located behind and extends away from the sealing flange on the melter tank. The support rail has a top surface that supports the second portion of the lid at the closure surface when the lid slides to the open position. The top surface of the support rail may be positioned at a higher elevation than the sealing flange so that the support rail causes the lifting of the closure surface in the transverse direction during sliding movement of the lid toward the open position. An angled lip may be provided on the rear edge of the closure surface so that the closure surface is guided onto the top surface of the support rail by abutting the angled lip with the support rail. The lid may also include a handle that is positioned such that an operator grasping the handle to move the lid can maintain control of the movement of the lid by continuing to grasp the handle throughout a full range of motion of the lid between the open and closed positions. Moreover, the plane defined by the sealing flange may be angled slightly from a horizontal orientation so that any vapors that coalesce into droplets on the closure surface migrate due to gravity and collect only along one edge of the closure surface.

In yet another aspect, each of the guide rails has a top surface and a side surface extending between the top surface and the melter tank. In such embodiments, the lid includes bearing elements such as low-friction pads that slide along the top surfaces of the guide rails to support the lid and roller bearings that roll along the side surfaces of the guide rails to guide the sliding movement of the lid. At least one of the guide rails may also include an anti-lift rail coupled to the side surface. One of the roller bearings rolls under the anti-lift rail when the lid is moved to the closed position so that upward pivoting movement of the lid away from the guide rails is prevented by the anti-lift rail. At least one of the guide rails may also include a bumper stop that is positioned to prevent further sliding movement of the lid once the lid has moved to the open position or the closed position. The guide rails may be spaced from the opposite sides of the sealing flange to define longitudinal gaps located adjacent to the low-friction pads. These longitudinal gaps serve as venting paths for removing adhesive vapors that may escape from the interior of the melter tank, thereby avoiding interference of the vapors with the sliding engagement between the lid and the guide rails. The sliding action of the lid provides a simplified and controllable mechanism for opening and closing the melter tank when necessary for cleaning, maintenance, or refilling of adhesive.

These and other objects and advantages of the invention will become more readily apparent during the following detailed description taken in conjunction with the drawings herein.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

FIG. 8 is a cross-sectional side view of the top wall and the lid assembly of FIG. 2, with the lid in a closed position over the opening in the top wall of the melter tank.

FIG. 9 is a cross-sectional side view of the top wall and the lid assembly of FIG. 8, with the lid in an intermediate position between the closed position and an open position.

DETAILED DESCRIPTION OF THE ILLUSTRATIVE EMBODIMENTS

Figure 1:
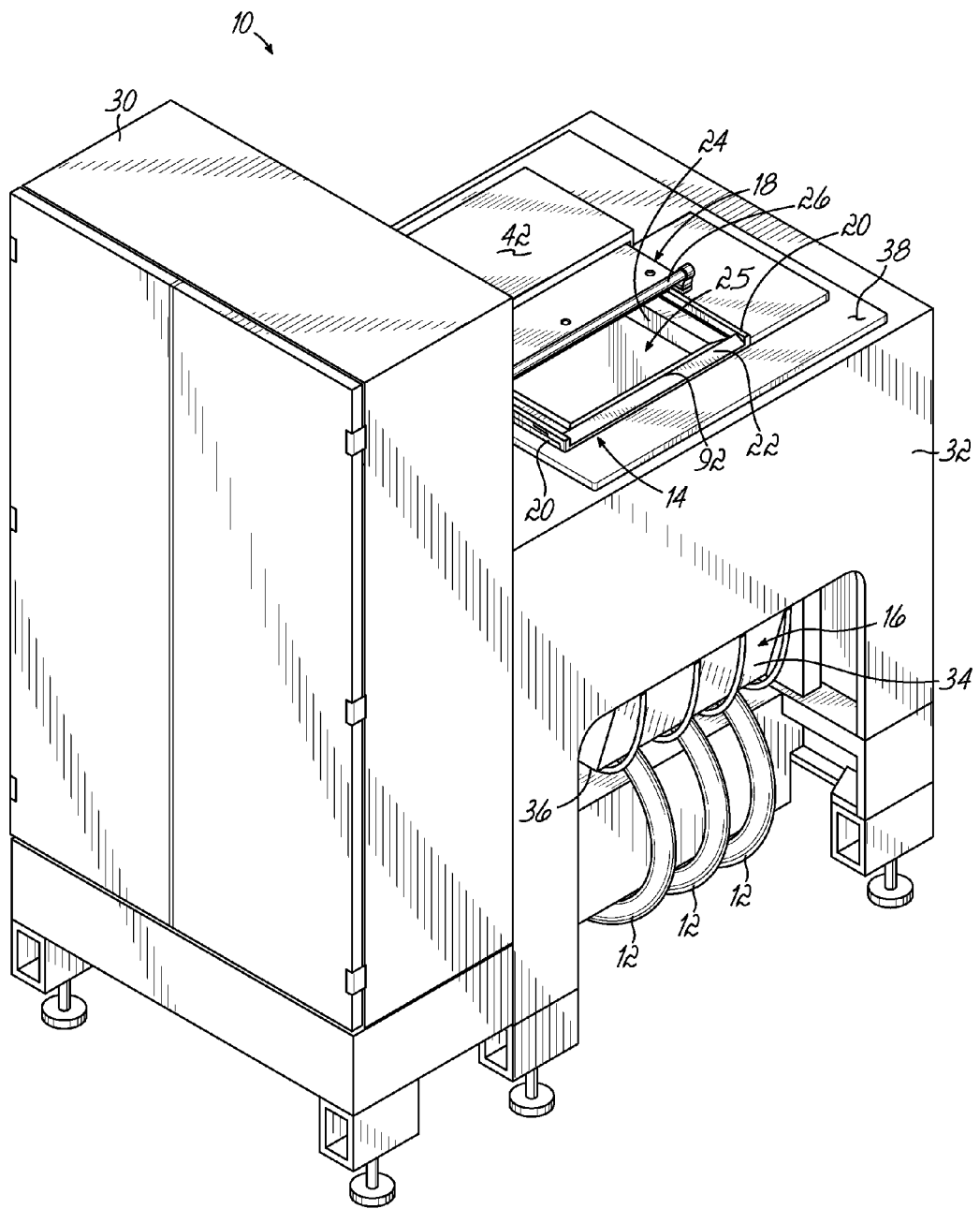
FIG. 1 is a perspective view of an adhesive melter for use in an adhesive dispensing system, the adhesive melter including a melter tank and a sliding lid assembly according to one embodiment of the current invention.

Referring to FIGS. 1 through 10, an adhesive melter 10 in accordance with an exemplary embodiment of the invention is shown. The adhesive melter 10 is a large tank-type melter 10 configured to melt large amounts of adhesive and supply that adhesive via a pump (not shown) and outlet conduits 12 to one or more dispensing devices located downstream from the adhesive melter 10. The adhesive melter 10 of the exemplary embodiment includes much of the same structure contained in VersaBlue® melters commercially available from Nordson Corporation of Westlake, Ohio. However, the adhesive melter 10 differs from the known melters in that a sliding lid assembly 14 is included at the top of the melter tank 16. The sliding lid assembly 14 includes a lid 18 that slides along guide rails 20 into and out of engagement with a sealing flange 22 that surrounds a top opening 24 communicating with an interior 25 of the melter tank 16. Unlike a conventional lid with a hinged design, the sliding movement of the lid 18 enables an operator to maintain control of the movements of the lid 18 because a handle 26 on the lid 18 remains in easy reach throughout the entire opening and closing movement of the lid 18. Furthermore, the sliding movement of the lid 18 keeps the lid 18 in a substantially horizontal orientation throughout the full range of movement, thereby avoiding the adverse effects of droplets of adhesive on the lid 18 falling into and gumming up the moving elements of the sliding mechanism (e.g., at the guide rails 20). The lid assembly 14 also eliminates the pinch risks that may be experienced by an operator when using the pivoting lid design of conventional melters. In this regard, the sliding lid assembly 14 improves the safety, ergonomics, and durability of the adhesive melter 10.

With particular reference to FIG. 1, the exemplary embodiment of the adhesive melter 10 is shown in further detail. To this end, the adhesive melter 10 includes a control cabinet 30 located alongside a tank housing 32 that substantially encloses the melter tank 16 as shown. The control cabinet 30 includes control and feedback elements (not shown) for operating and displaying operational parameters of various elements of the adhesive melter 10, including heaters at the melter tank 16 and the pump. The tank housing 32 at least partially isolates the hot sidewalls 34 defining the boundaries of the interior 25 of the melter tank 16 from the external environment. The melter tank 16 extends from a bottom end 36, which typically communicates with the pump, to the top opening 24 located in a top wall 38 of the melter tank 16. The melter tank 16 is configured to receive a supply of solid or semi-solid adhesive through the top opening 24 into the interior 25 and then melt and heat that adhesive to a molten state, then hold the adhesive in the molten state in the interior 25 for use by the dispensing devices connected to the adhesive melter 10. As noted above, the lid assembly 14 is located along the top wall 38 and allows selective opening and closing of the melter tank 16 at the top opening 24. It will be understood that the particular structure and arrangement of the elements of the adhesive melter 10 may be modified without departing from the scope of the invention.

Figure 2:
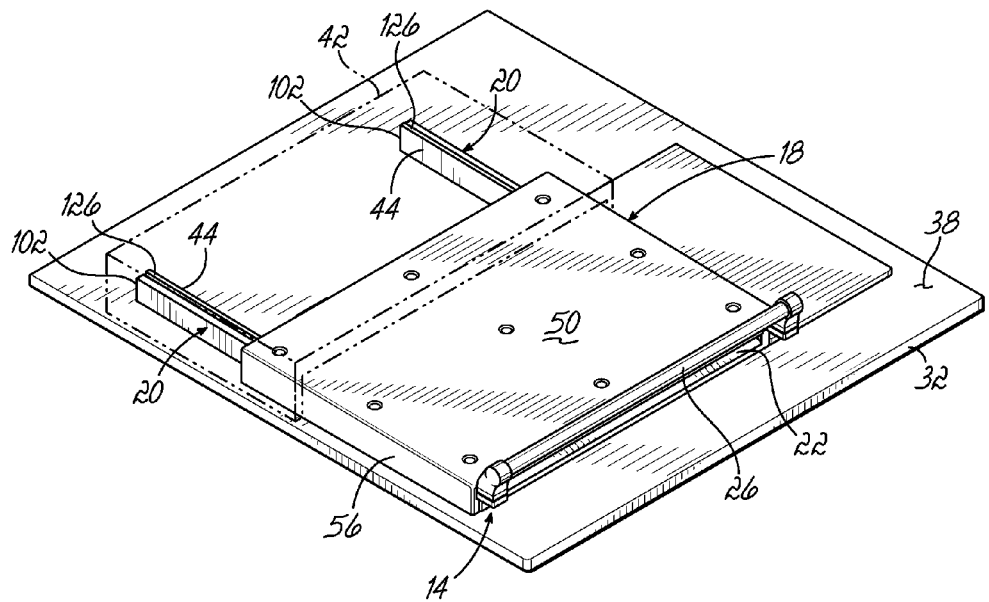
FIG. 2 is a top perspective view of a top wall of the melter and the lid assembly of FIG. 1, with a lid in a closed position over an opening in the top wall.
Figure 3:
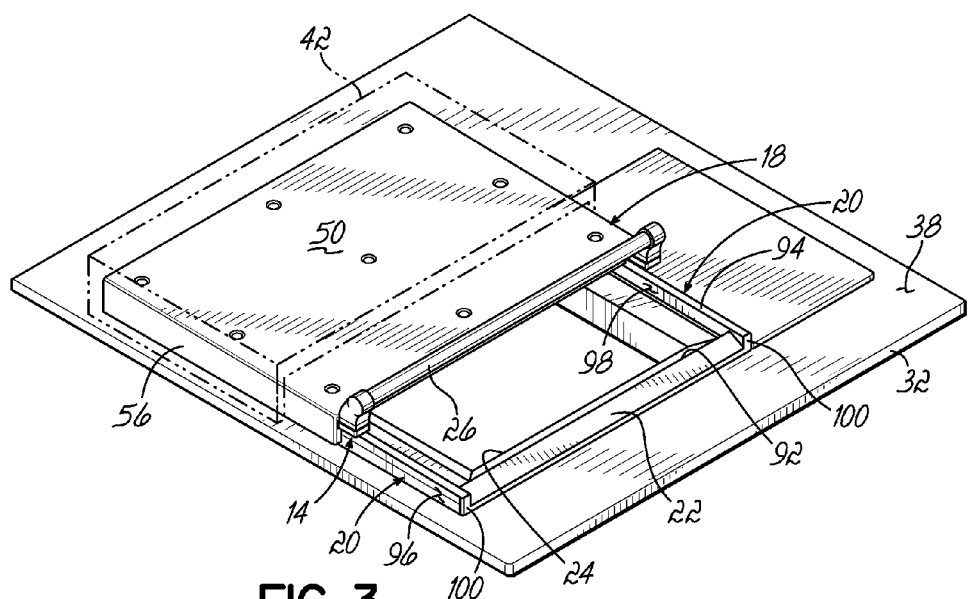
FIG. 3 is a top perspective view of the top wall and the lid assembly of FIG. 2, with the lid in an open position.

Turning to FIGS. 2 and 3, the lid assembly 14 and top wall 38 are illustrated in further detail. The lid assembly 14 may optionally include a lid receptacle 42 (shown in phantom in FIGS. 2 and 3) mounted on the top wall 38 behind the top opening 24. The lid receptacle 42 is configured to receive the lid 18 when the lid is slid rearward to the open position shown in FIG. 3, and the lid receptacle 42 also covers up otherwise exposed portions of the guide rails 20 and support rails 44 located adjacent to the guide rails 20. As described in further detail below, the guide rails 20 are configured to engage sliding or rolling bearing elements on the lid 18, while the support rails 44 are configured to support and lift a closure surface (not shown in FIGS. 2 and 3) of the lid 18 from the sealing flange 22 when the lid 18 is moved to the open position shown in FIG. 2. Consequently, to open and close the melter tank 16, an operator needs to only grasp the handle 26 located along a front wall 46 on the lid 18 and slide the lid 18 along the guide rails 20 between the closed position of FIG. 2 and the open position of FIG. 3. Even in embodiments of the adhesive melter 10 in which the top wall 38 is located 48 inches or more off the ground, most operators can still grasp the handle 26 at all positions along the full range of movement of the lid 18. This positioning and operation of the lid 18 therefore enables an operator to maintain full control of the movements of the lid 18 during operation of the lid assembly 14. The lid 18 also cannot fall or pivot due to gravity, which removes an unexpected pinch point from the lid assembly 14.

In order to enable the closure surface of the lid 18 to be lifted transversely upward off of the sealing flange 22 as the lid 18 slides from the closed position to the open position, the lid 18 is constructed from a first lid portion 18a and a second lid portion 18b that is moveable relative to the first lid portion 18a. More specifically, the first lid portion 18a includes an outer cover 50 and the bearing elements shown in FIG. 4, while the second lid portion 18b includes a floating plate 52 operatively coupled to the outer cover 50 and shown in FIG. 5. As described below, the floating plate 52 is configured to be moved concurrently with the outer cover 50 in a sliding manner generally parallel to the plane defined by the sealing flange 22, but the floating plate 52 has freedom to move in a transverse direction upwardly and downwardly relative to the outer cover 50. This operative coupling of the outer cover and the floating plate 52 helps operate the lid 18 with minimal interference caused by stiction at the sealing flange 22 or tolerance inconsistencies in the various components of the lid assembly 14 and melter tank 16. Although the exemplary embodiment of the lid assembly 14 includes a two-portion lid 18, other embodiments are possible within the scope of the invention in which the closure surface of the lid 18 moves relative to the rest of the lid without requiring two separate portions 18a, 18b.

Returning to FIG. 4, the first portion 18a of the lid 18 is shown from the bottom side to illustrate additional details of the outer cover 50. To this end, the outer cover 50 is a substantially open-bottomed box-shaped enclosure having a top panel 54, first and second sidewalls 56, 58, a rear wall 60 extending between the first and second sidewalls 56, 58, and the front wall 46 extending between the first and second sidewalls 56, 58. The first portion 18a of the lid 18 also includes first and second structural rails 62, 64 coupled to the top panel 54 and extending along the length of the outer cover 50 proximate to the first and second sidewalls 56, 58. The structural rails 62, 64 project beyond the front wall 46 to provide connection locations for the elongate handle 26, which is connected to each of the structural rails 62, 64 adjacent the front wall 46. The other end of the structural rails 62, 64 terminates within the outer cover 50 proximate to the rear wall 60. The structural rails 62, 64 carry the bearing elements, which include a pair of low-friction pads 66 located on each structural rail 62, 64 and a pair of roller bearings 68 located adjacent to the corresponding pair of low-friction pads 66 on each structural rail 62, 64. The low-friction pads 66 are configured to slide along the guide rails 20 and may be formed from polytetrafluoroethylene (Teflon®) or another similar material configured to slide with minimized friction. The roller bearings 68 extend farther below the level of the low-friction pads 66 and include sealed ball bearings (not shown) that enable rolling rotation along the sides of the guide rails 20. Accordingly, the structural rails 62, 64 connect the outer cover 50 to the bearing elements 66, 68 and enable the lid 18 to be moved with the sliding movement described throughout this application.

Figure 4:
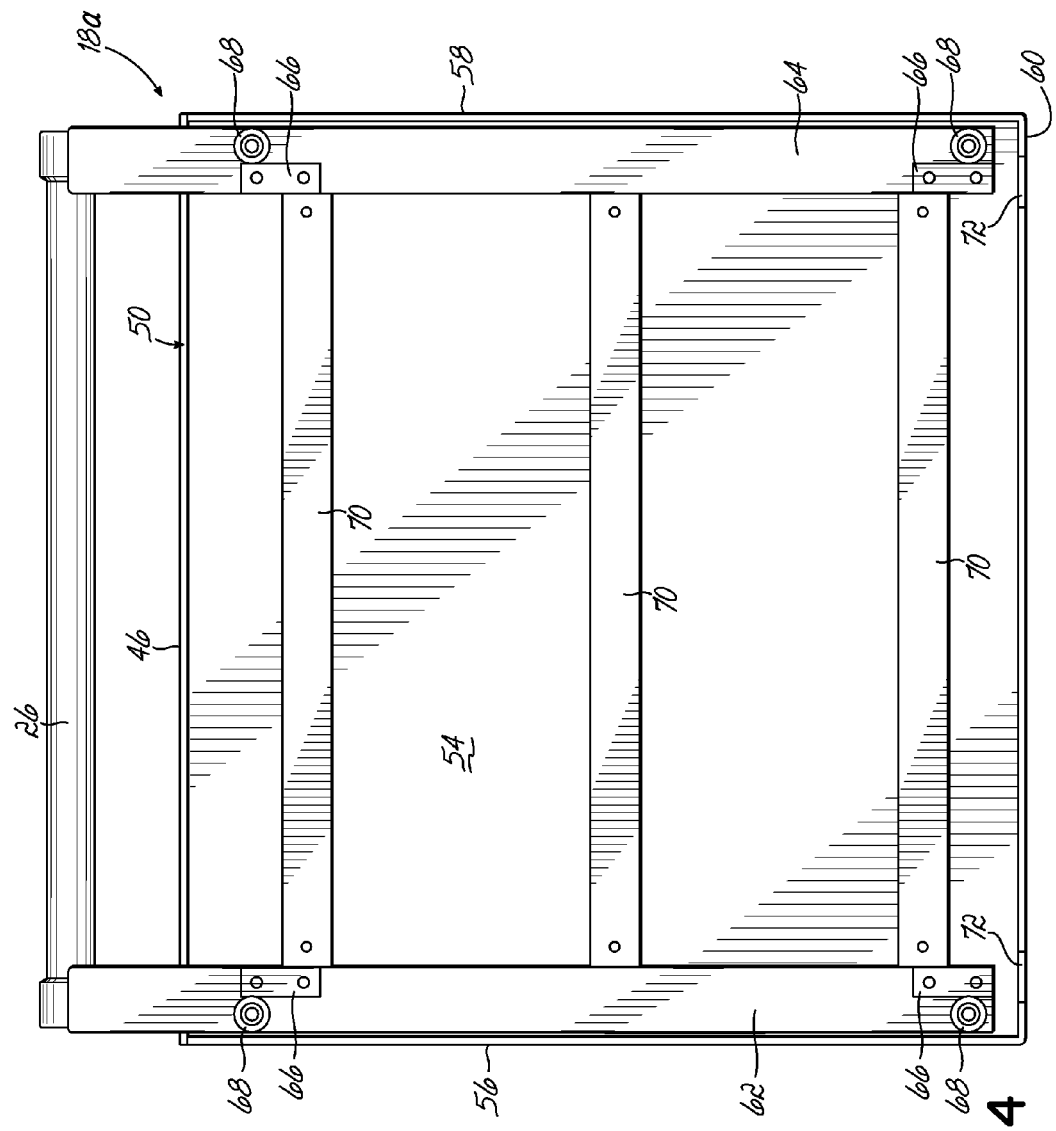
FIG. 4 is a bottom view of the lid of FIG. 1, with a floating plate removed from the lid to reveal interior structure.

With continued reference to FIG. 4, the first portion 18a of the lid 18 also includes a series of crossbars 70 extending laterally from the first structural rail 62 to the second structural rail 64. The crossbars 70 may be coupled to one or both of the top panel 54 and the structural rails 62, 64, and serve to strengthen the lid 18. In addition, the crossbar 70 located near the center of the top panel 54 is also used to engage the floating plate 52 as described in further detail below. However, one or more of the crossbars 70 or other similar structures may be provided to engage with the floating plate 52 in other embodiments of the lid 18. The engagement of the central crossbar 70 with the floating plate 52 is shown and described in greater detail with reference to FIGS. 8 through 10 below. The rear wall 60 of the outer cover 50 also includes a pair of openings 72 generally aligned with the structural rails 62, 64, and more specifically aligned with the pairs of low-friction pads 66. These openings 72 are positioned to receive the guide rails 20 and the support rails 44 as shown in greater detail below. The first portion 18a of the lid 18 provides a structurally rigid member that slides in a single back-and-forth direction along the guide rails 20 between the open and closed positions.

Figure 5:
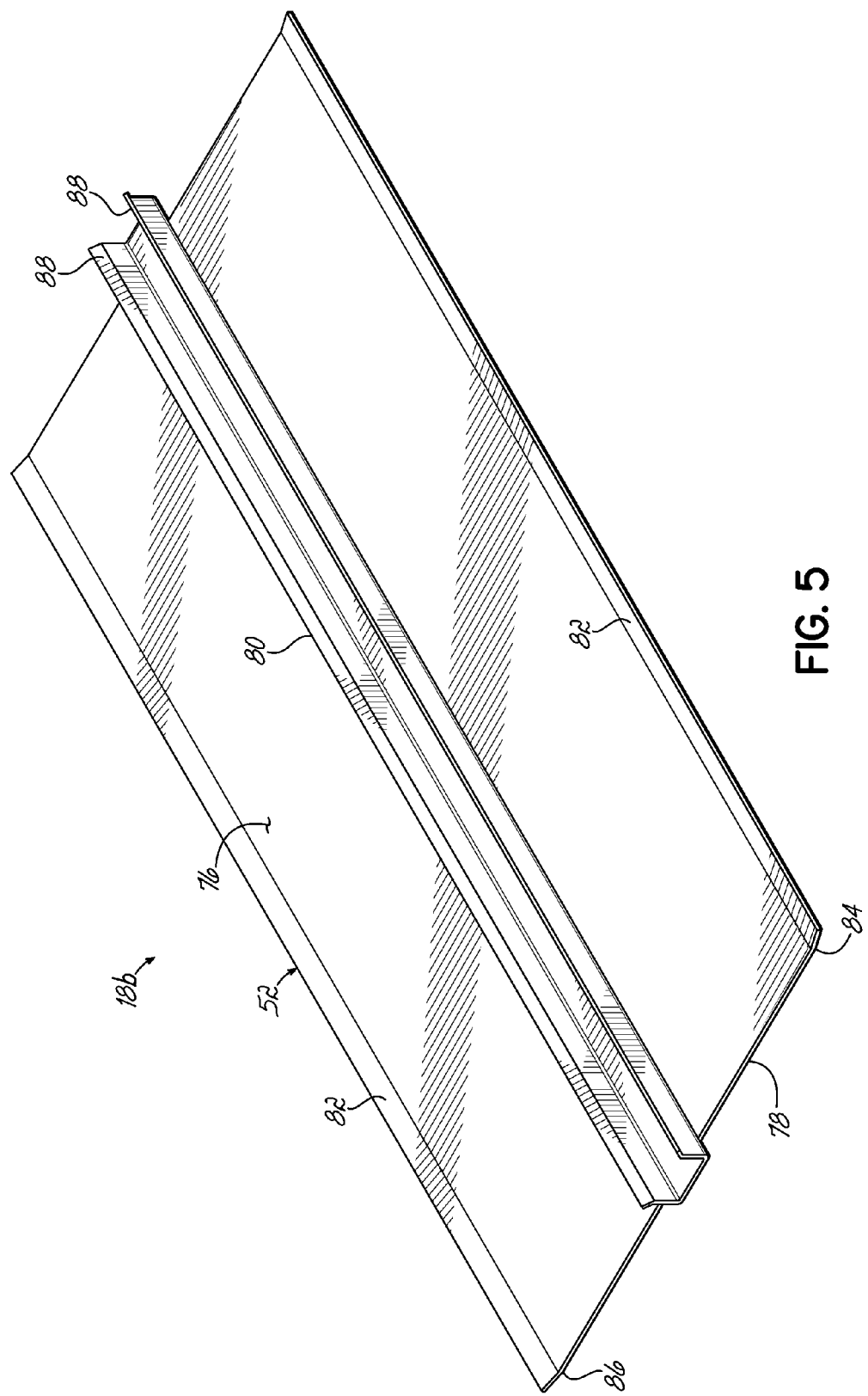
FIG. 5 is a top perspective view of the floating plate removed from the lid of FIG. 4.

Now turning to FIG. 5, the second portion 18b of the lid 18 is shown in further detail. To this end, the second portion 18b is defined by the floating plate 52 configured to come into and out of sealing engagement with the sealing flange 22 at the top opening 24. The floating plate 52 is a generally planar piece of material formed from steel or a similar metal and having an upper surface 76 and a lower closure surface 78 configured to face towards the melter tank 16. At the upper surface 76, the floating plate 52 also includes an elongate generally U-shaped bar receptacle 80 sized to receive the central crossbar 70 extending downwardly from the outer cover 50 of the first portion 18a of the lid 18. The bar receptacle 80 closely receives the central crossbar 70 so that sliding movement of the first portion 18a of the lid 18 causes sliding movement of the floating plate 52. As described above, the floating plate 52 may be provided with more or differently-located receptacles for engaging corresponding structures on the first portion 18a in other embodiments consistent with the scope of the invention. The floating plate 52 also includes angled lips 82 located at the front and rear edges 84, 86 of the generally planar piece of material defining the floating plate 52. The angled lips 82 assist with movement of the floating plate 52 between the support rails 44 and the sealing flange 22, as shown and described with reference to FIGS. 8 through 10 below. It will be appreciated that even though the U-shaped bar receptacle 80 is shown with outwardly-flaring edges 88 to assist with insertion of the central crossbar 70 into the bar receptacle 80 in the illustrated embodiment, the bar receptacle 80 may be modified with differently shaped edges 88 or no flaring edges 88 at all in other embodiments.

Figure 6:
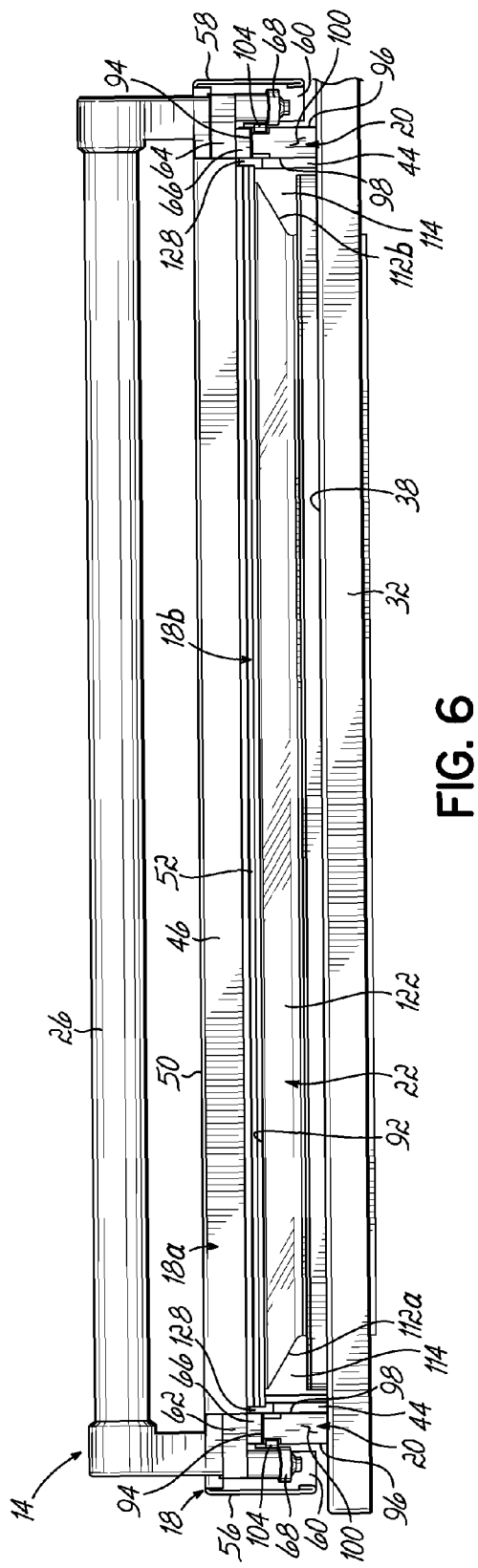
FIG. 6 is a front view of the top wall and the lid assembly of FIG. 2.
Figure 7:
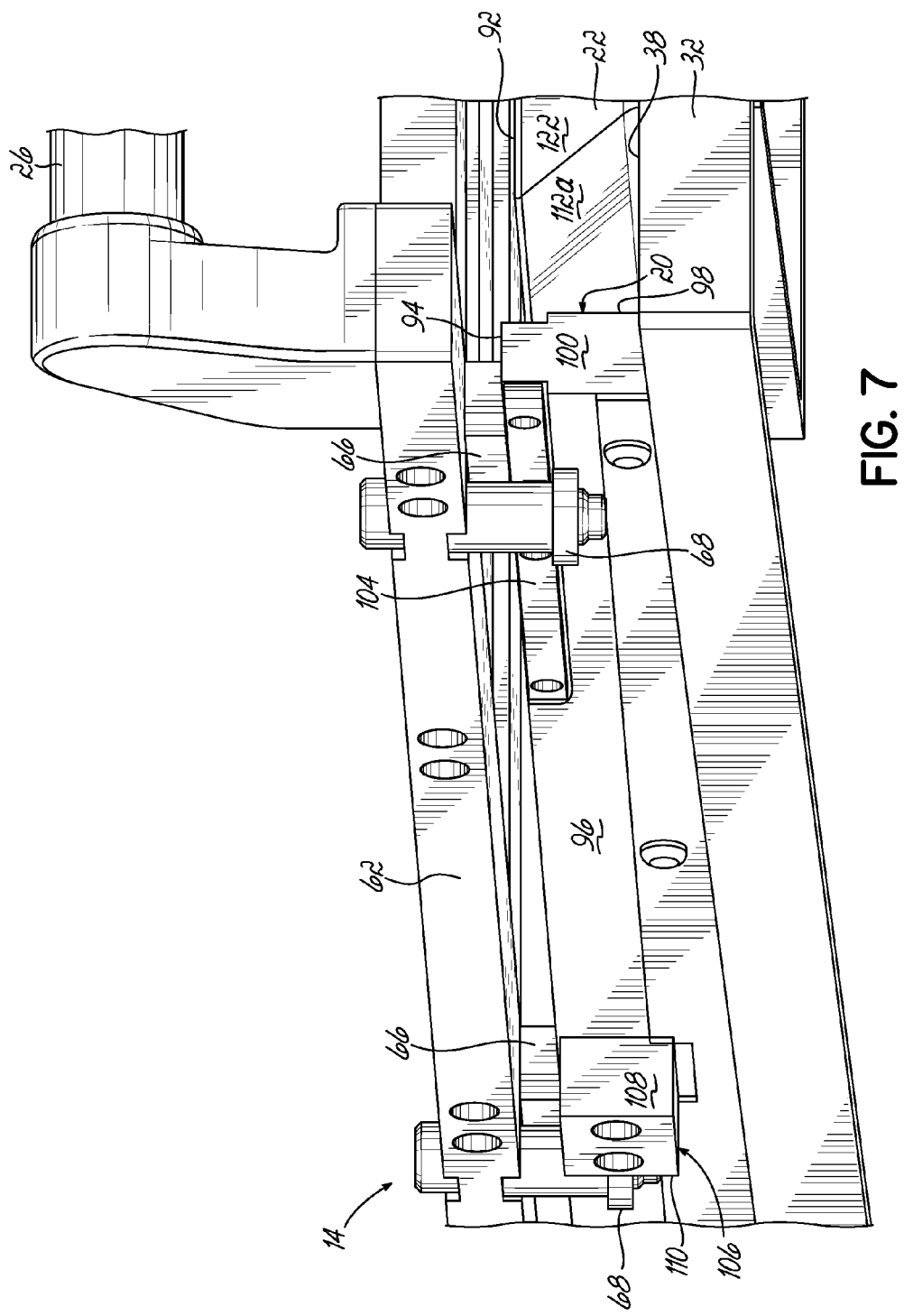
FIG. 7 is a detailed front perspective view of the top wall and the lid assembly of FIG. 6, with an outer cover of the lid removed to show bearing elements of a lid moving along guide rails coupled to the top wall.

With reference to FIGS. 6 and 7, the lid 18 in assembled form is shown in position over the sealing flange 22 of the melter tank 16 in further detail. To this end, the lid 18 has been moved to a closed position in which the floating plate 52 of the second lid portion 18b engages the sealing flange 22 to cover the top opening 24 of the melter tank 16. As shown most clearly in FIG. 6, the sealing flange 22 projects upwardly from the top wall 38 to provide a top flange surface 92 configured to engage the second lid portion 18b. As a result of this height of the sealing flange 22, the front wall 46 of the outer cover 50 on the lid 18 only extends down from the top panel 54 to around a lower end of the cross bar 70, thereby leaving much of the front of the lid 18 open for receiving the sealing flange 22 during sliding movement of the lid 18. Moreover, the generally open front of the lid 18 enables venting of any vapors or heat energy that may otherwise be captured within the outer cover 50. This venting helps prevent the first lid portion 18a and the handle 26 from becoming excessively hot during use, which ensures that an operator can grasp the handle 26 safely to move the lid 18 between open and closed positions.

Additional details of the engagement between the bearing elements 66, 68 of the lid 18 and the guide rails 20 are shown in FIGS. 6 and 7. More specifically, each of the guide rails 20 of the lid assembly 14 includes a top surface 94 located opposite the connection to the top wall 38 of the melter tank 16, an outer side surface 96 facing away from the sealing flange 22, and an inner side surface 98 facing towards the sealing flange 22. Each of these surfaces 94, 96, 98 extends from a front end 100 of the guide rail 20 located adjacent the sealing flange 22 to a back end 102 (see FIG. 2) of the guide rail 20 located within the lid receptacle 42. The low-friction pads 66 of the first lid portion 18a sit on the generally horizontal top surface 94 and slide along the top surface 94 as the lid 18 moves between the open and closed positions. Even though the weight of the first lid portion 18a is carried by the guide rails 20 and the low-friction pads 66, the lid 18 remains easy to slide along the guide rails 20 as a result of the low-friction interface presented by the material of the low-friction pads 66 sliding against the generally metal guide rails 20.

The pair of roller bearings 68, which extend downwardly from the first and second structural rails 62, 64, are positioned to roll along the outer side surfaces 96 of the corresponding guide rails 20. Therefore, the roller bearings 68 extend to a lower elevation than the low-friction pads 66, as shown in FIGS. 6 and 7. The engagement of the roller bearings 68 with the outer side surfaces 96 prevent the lid 18 from moving laterally to the left or right during sliding movement between the open and closed positions. In this regard, this engagement ensures that the low-friction pads 66 remain positioned on the top surfaces 94 of the guide rails 20 and also that the floating plate 52 remains in line with the sealing flange 22.

The guide rails 20 also include additional structure mounted along the outer side surfaces 96 to interact with the roller bearings 68 and limit movement of the lid 18 to the desired sliding movement. More particularly, the guide rails 20 include an anti-lift rail 104 coupled to the outer side surface 96 with threaded fasteners (not shown) or a similar connector. The anti-lift rail 104 is positioned adjacent to the top surface 94 of the guide rail 20 so that the roller bearings 68 can roll underneath the anti-lift rail 104 as shown most clearly in FIG. 6. Each anti-lift rail 104 is also positioned to extend from the front end 100 of the guide rail 20 along a short distance toward the back end 102 of the guide rail 20, such as about half of the length of the sealing flange 22. For example, the anti-lift rail 104 may be about 8 inches long when the total sliding movement of the lid 18 is about 14 to 15 inches. Therefore, the roller bearings 68 located near the front wall 46 of the lid 18 roll underneath the anti-lift rail 104 as the lid 18 approaches the closed position, and the anti-lift rail 104 blocks pivoting upward movement of the roller bearings 68 and the lid 18 away from the top wall 38 of the melter tank 16 when the lid 18 is in the closed position. As a result, an operator is prevented from lifting the lid 18 in a pivotal manner and must slide the lid 18 open as intended by the design of the lid assembly 14. Furthermore, the lid 18 remains positioned accurately over the sealing flange 22 to ensure a sealing closure of the floating plate 52 over the top opening 24 in the closed position. The anti-lift rails 104 only extend about halfway along the sealing flange 22 so that the roller bearings 108 can be lifted away from the guide rails 20 near the open position of the lid 18, when removal of the lid 18 is required for maintenance or some other reason. However, the most likely unintentional lifting or pivoting of the lid 18 by an operator at the closed position is prevented, so the anti-lift rails 104 enable removal of the lid 18 from the guide rails 20 only when that removal is truly intended by the operator. It will be understood that while an anti-lift rail 104 is provided on each of the guide rails 20 in the illustrated embodiment, only one anti-lift rail 104 may be used in other embodiments without departing from the scope of the invention.

Each of the guide rails 20 also includes a bumper stop 106 coupled to the outer side surface 96 with threaded fasteners (not shown) or a similar connector. The bumper stop 106 projects outwardly from the outer side surface 96 to an extent that the roller bearings 68 will run into the bumper stop 106 at the open and closed positions of the lid 18. In this regard, the bumper stop 106 may include a front stop end 108 configured to abut the roller bearing 68 located near the front wall 46 of the lid 18 when the lid 18 is slid back to the open position. The front stop end 108 prevents further sliding movement of the lid 18 because the lid 18 provides full access to the melter tank 16 through the top opening 24 in this position. The bumper stop 106 may also include a rear stop end 110 configured to abut the roller bearing 68 located near the rear wall 60 of the lid 18 when the lid 18 is slid forward to the closed position. The rear stop end 110 prevents further sliding movement of the lid 18 at the closed position to avoid pulling the lid 18 too far forward beyond the sealing flange 22 and top opening 24 of the melter tank 16. It will be understood that the bumper stop 106 may be provided as two different bumper stops and repositioned without departing from the scope of the invention. Therefore, the roller bearings 68 interact with the outer side surfaces 96 of the guide rails 20 as well as the anti-lift rails 104 and bumper stops 106 to guide the sliding movement of the lid 18 along the prescribed path.

As shown in FIGS. 6 and 7, the inner side surfaces 98 of the guide rails 20 are spaced from the opposing sides 112a, 112b of the sealing flange 22. This spacing defines a longitudinal gap 114 located along each side of the sealing flange 22. The longitudinal gap 114 freely communicates with the open front of the lid 18 and may also communicate through the openings 72 in the rear wall 60 of the lid 18 and openings (not shown) in the lid receptacle 42 with the environment outside the lid assembly 14. To this end, an escape path is provided for any adhesive vapors that may escape from the top opening 24, and the adhesive vapors are led away from the interface between the low-friction pads 66 and the guide rails 20 and also away from the roller bearings 68. The venting of adhesive vapors helps avoid any gumming up or sticking of the bearing elements 66, 68 that could adversely affect the sliding operation of the lid 18 over time. The longitudinal gap 114 therefore improves the long-term reliability of the sliding lid assembly 14.

Aligned with the longitudinal gaps 114, the support rails 44 are located adjacent to the inner side surfaces 98 of the guide rails 20 but behind the sealing flange 22 of the melter tank 16. Accordingly, a leading end 120 of the support rails 44 is visible from the front of the lid 18 through the longitudinal gaps 114 as shown in FIG. 6. The profile and use of one of these guide rails 20 is shown in further detail with reference to FIGS. 8 through 10. To this end, the sealing flange 22 includes a front end 122 and a rear end 124 as shown in FIG. 8, and the guide rails 20 extend rearward from the leading end 120, which is located a short space behind the rear end 124 of the sealing flange 22. Consequently, the floating plate 52 is configured to slide between engagement with the sealing flange 22 and engagement with the support rail 44. The support rail 44 includes a top supporting surface 126 configured to engage the floating plate 52 when the lid 18 is slid toward the open position. The top supporting surface 126 is generally horizontal except at a chamfered portion 128 located adjacent to the leading end 120. As described in further detail below, the chamfered portion 128 is provided to assist with moving the floating plate 52 and the associated angled lip 82 onto the top supporting surface 126. The chamfered portion 128 may be reconfigured as a rounded corner or another shape in other embodiments that would operate consistently with the invention. Moreover, although two support rails 44 are shown located adjacent to the inner side surfaces 98 of the guide rails 20, a different number or positioning of support rails 44 located between the guide rails 20 and behind the sealing flange 22 may be used in other embodiments.

Figure 10:
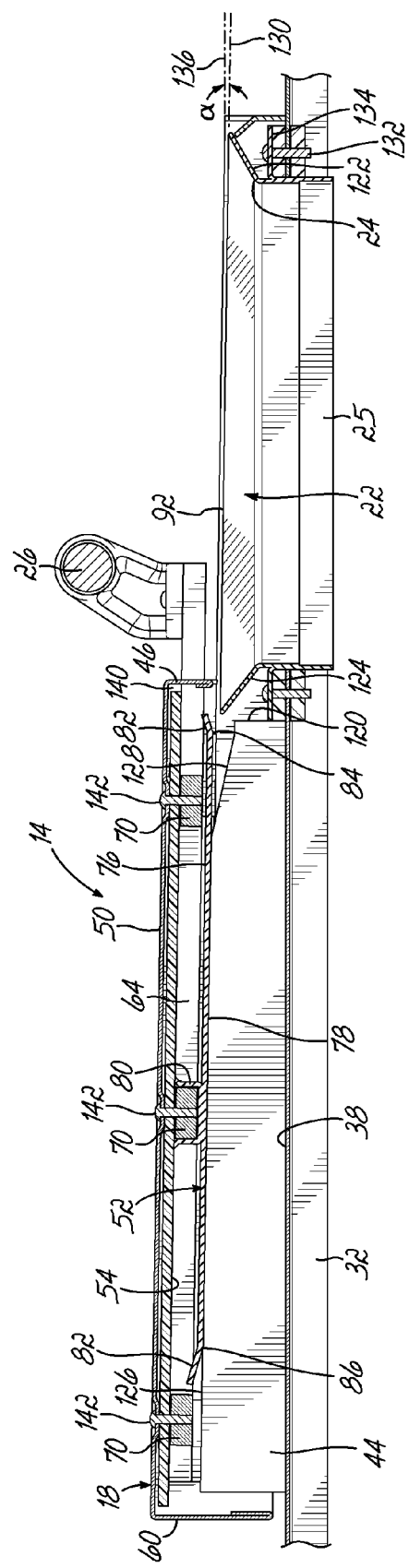
FIG. 10 is a cross-sectional side view of the top wall and the lid assembly of FIG. 9, with the lid in the open position.

With continued reference to FIGS. 8 through 10, the operation of the lid assembly 14 is illustrated. To this end, the lid 18 is located in a closed position over the top opening 24 in FIG. 8. In this position, the floating plate 52 has moved downwardly relative to the crossbar 70 and the outer cover 50 so that the closure surface 78 engages the top flange surface 92 of the sealing flange 22. Moreover, the weight of the floating plate 52 keeps the second portion 18b of the lid 18 in sealing engagement over the top opening 24, thereby closing the melter tank 16 from the outside environment and preventing adhesive vapors from escaping into the outside environment. When the melter tank 16 is to be opened for refilling, cleaning, or other maintenance, an operator grasps the handle 26 and slides the lid 18 rearward towards the intermediate position shown in FIG. 9. As readily understood from FIGS. 8 and 9, the angled lip 82 along the rear edge 86 of the floating plate 52 and the chamfered portion 128 of the support rails 44 will come into engagement after the outer cover 50 has moved the floating plate 52 only a very short distance. As a result of abutting the angled lip 82 into the chamfered portion 128, further sliding movement of the lid 18 forces the floating plate 52 and closure surface 78 to move upwardly and transversely away from the top flange surface 92 of the sealing flange 22. This transverse movement away from a plane 130 defined by the top flange surface 92 breaks any stiction formed between the closure surface 78 and the top flange surface 92 while the floating plate 52 was located in the closed position. In this regard, the positioning of the support rails 44 is configured to make sliding movement of the lid 18 between the open and closed positions as easy as possible.

As shown in FIGS. 8 through 10, the top supporting surface 126 of the support rails 44 is located at a higher elevation above the top wall 38 than the plane 130 defined by top flange surface 92. Accordingly, by the time that the lid 18 has been slid back to the intermediate position shown in FIG. 9, the floating plate 52 has moved upwardly relative to the outer cover 50 enough to lift the closure surface 78 completely off of the top flange surface 92. As a result, the closure surface 78 does not drag along any portion of the top flange surface 92 for much of the sliding movement of the floating plate 52 between the open and closed positions. The crossbar 70 on the outer cover 50 and the U-shaped bar receptacle 80 on the floating plate 52 are designed with enough transverse clearance to maintain the coupling in the open position shown in FIG. 8, while providing room for the bar receptacle 80 to more closely engage the crossbar 70 when the floating plate 52 slides on top of the top supporting surface 126 of the support rails 44, as shown in FIG. 9. The handle 26 may continue to be pushed rearward from this intermediate position to the open position shown in FIG. 10. In the open position, the floating plate 52 has been pushed rearward to be completely supported on the support rails 44 and located immediately behind the rear end 124 of the sealing flange 22. This provides full access to the melter tank 16 through the top opening 24. Therefore, the transverse movement of the second lid portion 18b and the floating plate 52 relative to the outer cover 50 of the first lid portion 18a advantageously enables the benefits of using a floating plate 52 without the drawbacks of a complex sliding mechanism, sticking due to stiction between surfaces, and damage to the sealing flange 22 by dragging the floating plate 52 along the top flange surface 92.

To close the lid 18 back over the top opening 24, the sliding steps described above are reversed as the handle 26 is pulled from the open position shown in FIG. 10 through the intermediate position and back to the closed position shown in FIG. 8. Once a majority of the floating plate 52 has slid off of the top supporting surface 126 of the support rails 44, the floating plate 52 moves in a direction transverse relative to the sliding direction downward into engagement with the sealing flange 22. When the floating plate 52 finishes sliding off of the top supporting surface 126, the floating plate 52 will fall by its own weight so that the closure surfaces 78 comes into sealing engagement with the top flange surface 92. Assuming that the roller bearings 68 have rolled underneath the anti-lift rails 104 in this closed position, the lid 18 is prevented from lifting or pivoting upwardly away from the closed position. The operator maintains full control of the movement of the lid 18 at the handle 26 during this opening and closing process, and that prevents unexpected pinching of an operator's hand in the top opening 24 that may be caused by falling lids 18 in other designs. Additionally, if the interior 25 of the melter tank 16 happens to be overfilled when the lid 18 is open, the handle 26 and front wall 46 of the lid 18 will push that excess adhesive out of the way and away from the melter tank 16 as the lid 18 slides over and into engagement with the sealing flange 22. Thus, the melter tank 16 can advantageously still be completely closed when overfilling occurs at the top opening 24.

As shown most clearly in FIGS. 8 through 10, the sealing flange 22 may be coupled in position on the top wall 38 by several fasteners 132 extending through projections 134 on the sealing flange 22 and the top wall 38 on the melter tank 16. The sealing flange 22 is connected in such a way that the plane 130 defined by the top flange surface 92 is angled from a horizontal plane 136 by a small amount. In the exemplary embodiment, the front end 122 of the sealing flange 22 is located at a lower elevation that the rear end 124 of the sealing flange 22 such that the plane 130 through the top flange surface 92 is angled by an angle $\alpha$ of about 1 degree downwardly from the horizontal plane 136 (shown in FIG. 10). This angling of the sealing flange 22 causes the floating plate 52 and the closure surface 78 to be slightly angled when located in the closed position. That slight angling is also enabled by the loose coupling between the U-shaped bar receptacle 80 and the crossbar 70. When the closure surface 78 is slightly angled in the closed position, vapors that tend to condense into droplets along the closure surface 78 will migrate due to gravity and collect primarily along one edge of the closure surface 78, and more specifically, along the front edge 84 of the closure surface 78 in the exemplary embodiment. This limits the area where droplets will fall off of the closure surface 78 during operation of the adhesive melter 10. Advantageously, this also limits where adhesive droplets may fall off of the closure surface 78 when the lid 18 is moved to the open position. If any adhesive droplets were to fall off the floating plate 52 in the open position, these droplets would collect only at a specific location on the top wall 38 between the support rails 44 and immediately behind the rear end 124 of the sealing flange 22. This location is readily accessible when the lid 18 is removed for cleaning, and this location is not used for any sliding interface between the lid 18 and the guide rails 20. Consequently, the angling of the sealing flange 22 limits the location of any dripping of adhesive droplets from the closure surface 78 to non-critical locations in the lid assembly 14.

Also shown in FIGS. 8 through 10, the top panel 54 of the outer cover 50 in the first lid portion 18*a* may be formed as a two-plate construction to thereby define an air gap 140 between the crossbars 70 and the outermost extent of the top panel 54. This air gap 140 insulates the outermost extent of the top panel 54 from receiving heat energy that may be transmitted through the top wall 38 and sealing flange 22 into the lid 18. Consequently, the air gap 140 helps assure that the handle 26 and other exposed portions of the lid 18 are not too hot for contact with the operator's hands during operation of the adhesive melter 10. Several of the fasteners 142 connecting the two-plate construction of the top panel 54 to the crossbars 70 are also shown in these views.

The sliding lid assembly 14 advantageously improves the safety, ergonomics, and durability of the adhesive melter 10 compared to pivoting lid designs. More specifically, an operator can maintain control of the sliding movement enabled by the lid 18 for the full range of motion between the open and closed positions, even when the top wall 38 of the melter tank 16 is located 48 inches or higher above a floor surface. This fully controlled movement avoids any likelihood that the operator will pinch a hand or some other body part within the top opening 24 when the melter tank 16 is to be closed. The lid assembly 14 includes bearing elements 66, 68 configured to keep the lid 18 sliding along a predictable and repeatable path, and the bearing elements 66, 68 are not subject to interference from adhesive vapors collecting in the lid 18 or adhesive droplets falling from a closure surface 78 on the lid 18. The simple sliding movement of the lid assembly 14 also enables full closure of the melter tank 16 at the top opening 24 even when the melter tank 16 is overfilled with adhesive during a refilling operation. Accordingly, the sliding lid assembly 14 provides the same benefits as other pivoting lid designs while avoiding several of the drawbacks with those pivoting lid designs.

While the present invention has been illustrated by a description of an exemplary embodiment, and while that embodiment has been described in considerable detail, there is no intention to restrict, or in any way limit, the scope of the appended claims to such detail. Additional advantages and modifications will readily appear to those skilled in the art. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. An adhesive melter configured for use in an adhesive dispensing system, the melter comprising:
   a melter tank including a top opening and an interior communicating with said top opening;
   a sealing flange surrounding said top opening; and
   a lid assembly configured to selectively open and close said melter tank at said top opening, said lid assembly comprising:
      guide rails positioned on said melter tank on opposite sides of said top opening; and
      a lid including a closure surface adapted to selectively engage said sealing flange, said lid coupled to said guide rails for movement of said lid between an open position for filling said interior with adhesive through said top opening and a closed position engaging said sealing flange, wherein the movement between the open position and the closed position includes movement of said closure surface in a direction transverse to a plane defined by said sealing flange simultaneous to sliding movement of said closure surface generally along said plane, wherein said lid further comprises:
      a first portion coupled to said guide rails for sliding movement along said guide rails and along said plane; and
      a second portion including said closure surface, said second portion being moveable relative to said first portion such that said closure surface can move in the direction transverse to said plane simultaneous to and independent from the sliding along said plane.

2. The adhesive melter of claim 1, wherein said first portion includes an outer cover partially surrounding said second portion.

3. The adhesive melter of claim 2, wherein said second portion includes a floating plate defining said closure surface, said floating plate operatively coupled to said outer cover such that sliding movement of said outer cover causes sliding movement of said floating plate along said plane, but said floating plate is free to move relative to said outer cover in the direction transverse to said plane.

4. The adhesive melter of claim 3,
   wherein said floating plate includes an elongate receptacle facing towards said outer cover, and said first portion further includes a crossbar coupled to said outer cover and configured to be received within said elongate receptacle of said floating plate to operatively couple said floating plate and said outer cover.

5. The adhesive melter of claim 1, wherein said lid further includes a handle configured to be grasped by an operator to cause said lid to slide along said guide rails, said handle being positioned such that the operator can readily maintain control of the movement of said lid by grasping said handle throughout a full range of motion of said lid between the open position and the closed position.

6. An adhesive melter configured for use in an adhesive dispensing system, the melter comprising:
   a melter tank including a top opening and an interior communicating with said top opening;
   a sealing flange surrounding said top opening; and
   a lid assembly configured to selectively open and close said melter tank at said top opening, said lid assembly comprising:
      guide rails positioned on said melter tank on opposite sides of said top opening; and
      a lid including a closure surface adapted to selectively engage said sealing flange, said lid coupled to said guide rails for movement of said lid between an open position for filling said interior with adhesive through said top opening and a closed position engaging said sealing flange, wherein the movement between the open position and the closed position includes movement of said closure surface in a direction transverse to a plane defined by said sealing flange simultaneous to sliding movement of said closure surface generally along said plane,
      wherein said lid further comprises:
      a first portion coupled to said guide rails for sliding movement along said guide rails; and a second portion including said closure surface, said second portion being moveable relative to said first portion such that said closure surface can move in the direction transverse to said plane simultaneous to sliding along said plane, and wherein said lid assembly further comprises:
a support rail located behind and extending away from said sealing flange on said melter tank, said support rail including a top surface configured to support said second portion of said lid at said closure surface when said lid slides to the open position.

7. The adhesive melter of claim 6, wherein said top surface of said support rail is positioned at a higher elevation than said plane defined by said sealing flange such that said support rail causes the lifting of said closure surface transversely away from said plane as said lid slides rearward relative to said guide rails, to thereby break any stiction formed between said closure surface and said sealing flange.

8. The adhesive melter of claim 7, wherein said second portion further includes an angled lip extending from an edge of said closure surface facing said support rail, said angled lip positioned to abut said support rail during rearward sliding movement of said lid to guide said closure surface to slide onto said top surface of said support rail when moving said lid to the open position.

9. An adhesive melter configured for use in an adhesive dispensing system, the melter comprising:
a melter tank including a top opening and an interior communicating with said top opening;
a sealing flange surrounding said top opening; and
a lid assembly configured to selectively open and close said melter tank at said top opening, said lid assembly comprising:
guide rails positioned on said melter tank on opposite sides of said top opening; and
a lid including a closure surface adapted to selectively engage said sealing flange, said lid coupled to said guide rails for movement of said lid between an open position for filling said interior with adhesive through said top opening and a closed position engaging said sealing flange, wherein the movement between the open position and the closed position includes movement of said closure surface in a direction transverse to a plane defined by said sealing flange simultaneous to sliding movement of said closure surface generally along said plane,
wherein each of said guide rails includes a top surface and a side surface extending between said top surface and said melter tank, and said lid further includes bearing elements which comprise:
low-friction pads positioned to slide along said top surfaces of said guide rails to support said lid; and
roller bearings positioned to roll along said side surfaces of said guide rails to guide sliding movement of said lid.

10. The adhesive melter of claim 9, wherein at least one of said guide rails includes an anti-lift rail coupled to said side surface, said anti-lift rail positioned such that one of said roller bearings of said lid rolls underneath said anti-lift rail when said closure surface moves into engagement with said sealing flange, such that said anti-lift rail blocks upward pivoting movement of said roller bearing and said lid off of said guide rails when said lid is in the closed position.

11. The adhesive melter of claim 9, wherein at least one of said guide rails includes a bumper stop coupled to said side surface, said bumper stop positioned to prevent further sliding movement of said lid once said lid has arrived at the open position or the closed position.

12. The adhesive melter of claim 9, wherein said guide rails are spaced from said opposite sides of said top opening so as to define longitudinal gaps located adjacent said low-friction pads, said longitudinal gaps communicating with an environment outside said lid so as to provide a venting path for removing any adhesive vapors escaping from said interior of said melter tank away from said guide rails and said low-friction pads.

13. An adhesive melter configured for use in an adhesive dispensing system, the melter comprising:
a melter tank including a top opening and an interior communicating with said top opening;
a sealing flange surrounding said top opening; and
a lid assembly configured to selectively open and close said melter tank at said top opening, said lid assembly comprising:
guide rails positioned on said melter tank on opposite sides of said top opening; and
a lid including a closure surface adapted to selectively engage said sealing flange, said lid coupled to said guide rails for movement of said lid between an open position for filling said interior with adhesive through said top opening and a closed position engaging said sealing flange, wherein the movement between the open position and the closed position includes movement of said closure surface in a direction transverse to a plane defined by said sealing flange simultaneous to sliding movement of said closure surface generally along said plane,
wherein said plane defined by said sealing flange is angled at a small angle from a horizontal plane such that when said closure surface is engaged with said sealing flange, any adhesive vapors within said melter tank that form droplets of adhesive on said closure surface will migrate due to gravity and collect along only one edge of said closure surface.

14. The adhesive melter of claim 13, wherein said sealing flange is angled 1 degree downward from a rear end to a front end such that droplets of adhesive formed on said closure surface collect along only a front edge of said closure surface.

* * * * *